O. KLUGE.
MOWING ATTACHMENT FOR MOTOR VEHICLES.
APPLICATION FILED MAR. 14, 1912.
1,069,705.
Patented Aug. 12, 1913.
2 SHEETS—SHEET 2.
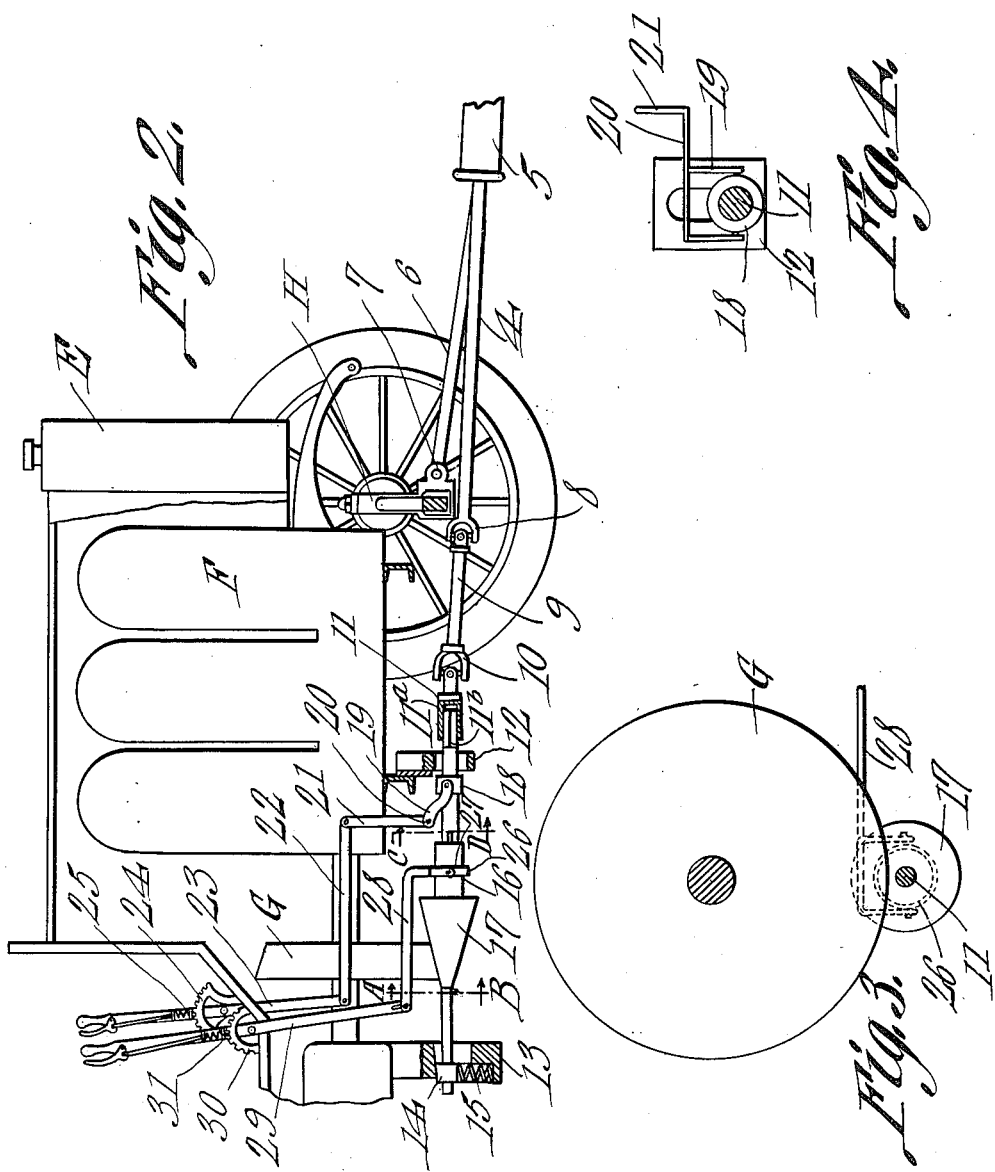
Witnesses
Otto Kluge, Inventor
by C.A. Snow & Co., Attorneys

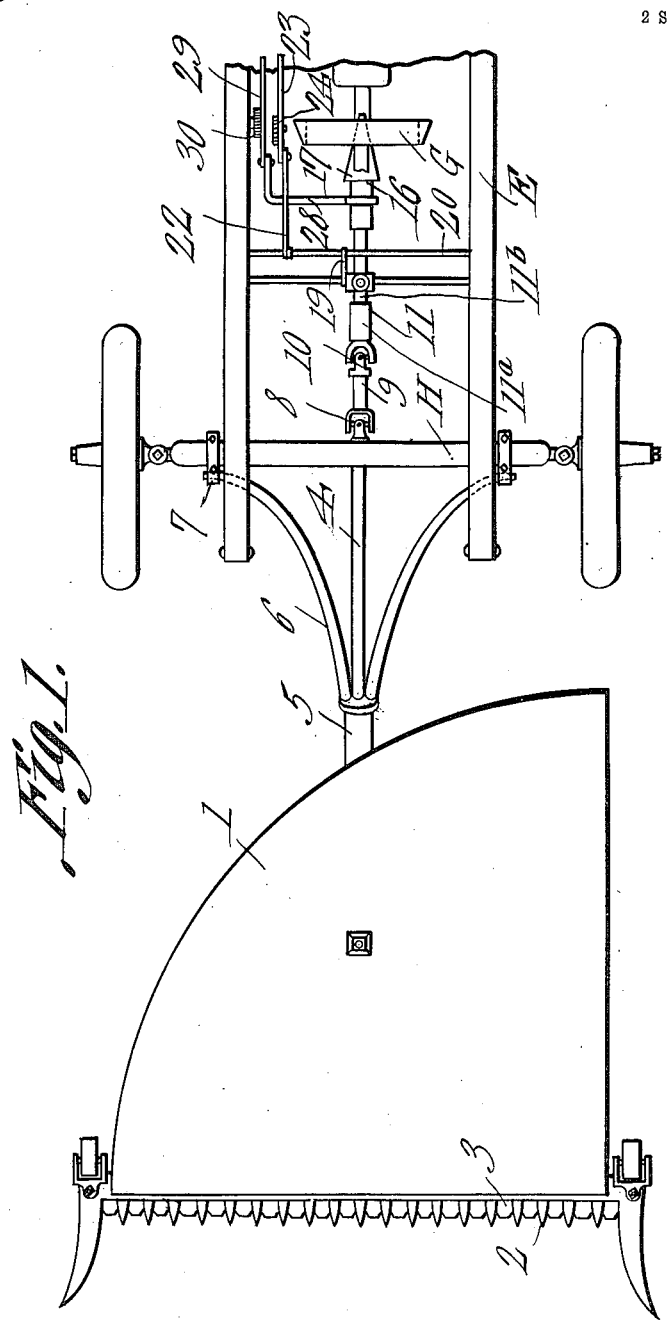

UNITED STATES PATENT OFFICE.

OTTO KLUGE, OF GOLCONDA, ILLINOIS.

MOWING ATTACHMENT FOR MOTOR-VEHICLES.

1,069,705. Specification of Letters Patent. Patented Aug. 12, 1913.

Application filed March 14, 1912. Serial No. 683,784.

*To all whom it may concern:*

Be it known that I, OTTO KLUGE, a citizen of the United States, residing at Golconda, in the county of Pope and State of Illinois, have invented a new and useful Mowing Attachment for Motor-Vehicles, of which the following is a specification.

This invention relates to a power transmitting attachment for motor vehicles, its principal object being to provide an attachment of this type which can be utilized for driving, mowing or other mechanism attached to the front of a motor vehicle and which is provided with means for receiving motion from a wheel driven by the motor of the vehicle.

A further object is to provide an attachment having means for controlling the speed of operation of the driven element and having additional means for shifting said element into or out of operative relation with the power wheel.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

In said drawings:—Figure 1 is a plan view of a portion of a motor vehicle and of the mowing attachment constituting the present invention. Fig. 2 is a side elevation of the parts shown in Fig. 1. Fig. 3 is an enlarged section on line A—B Fig. 2. Fig. 4 is an enlarged section on line C—D Fig. 2.

Referring to the figures by characters of reference E designates a portion of a motor vehicle the motor F of which is located in the front portion thereof as ordinarily and drives a fly wheel G. The axle H at the front of the vehicle drops below the hood of the motor vehicle and constitutes a support for the rear portion of the attachment constituting the present invention.

The attachment includes a front platform 1 having a finger bar 2 arranged along the front edge thereof, there being a reciprocating cutter bar 3 coöperating with the finger bar, this cutter bar and finger bar being of the usual or any preferred construction. This cutter bar may be operated by any suitable mechanism such as shown, for example, in a co-pending application filed by me on January 15, 1912, Serial No. 671,185 and in my co-pending application filed April 8, 1912, Serial No. 689,392. It is not deemed necessary to go into a detail explanation of this mechanism inasmuch as the same constitutes no part of the present invention. It is enough to state that the mechanism includes a shaft 4 journaled in the frame 5 on which the platform 1 is mounted, said frame being connected to the axle H by means of diverging arms 6 pivotally connected to brackets 7 which are secured to the axle H. Shaft 4 is connected, as by means of a universal joint 8 to a short shaft section 9 which, in turn, is connected, as by means of a universal joint 10 to a shiftable shaft section 11 made up of a tubular portion 11$^a$ and an angular portion 11$^b$ telescoping thereinto, said section being mounted within bearings 12 and 13. These bearings are provided with vertical slots so that it is possible for the shaft section 11 to be shifted upwardly or downwardly within the bearings. The said bearings may be connected to the chassis of the vehicle in any desired manner. A block 14 is loosely engaged by one end portion of the shaft section 11 and is mounted to slide within the bearing 13, there being a spring 15 engaging this block and adapted to hold the shaft section 11 normally elevated.

A sleeve 16 is feathered on the shaft section 11 and has a conical friction element 17 secured thereto and revoluble therewith. This element is designed normally to engage the periphery of the wheel G, said periphery being preferably beveled or inclined as shown, so as to engage, throughout its width, with the conical friction member 17. A collar 18 is loosely mounted on the shaft section 11 close to the bearing 12 and is pivotally engaged by arms 19 extending from a rock shaft 20, another arm being extended from this rock shaft and connected by a link 22, to a lever 23. This lever extends through the body of the motor vehicle in front of the driver's seat and has any suitable means, such as a toothed segment 24 and a pawl 25, for locking the lever in any position to which it may be adjusted.

A ring 26 is loosely engaged by a sleeve 16, said ring being fitted within a groove 27 in the sleeve. An arm 28 extends from the ring and is pivotally connected to it, said arm being attached to one end of a lever 29 which extends upwardly through the body of the vehicle and has any suitable means, such as a segment 30 and a pawl 31, for locking the lever in any position to which it may be adjusted.

From the foregoing it will be apparent that by shifting lever 23 in one direction, the arms 19 can be caused to swing downwardly and thus move the collar 18 and the shaft section 11 downwardly. The block 14 thus becomes the fulcrum of the shaft section 11 and the friction member 17 will swing out of engagement with the wheel G. The friction member 17 can then be shifted longitudinally by means of lever 29 and arm 28, ring 26 serving to shift the sleeve 16 longitudinally of the shaft section 11. When the friction member 17 has been brought into a desired position relative to wheel G, collar 18 is elevated by means of its lever 23 and the friction element 17 is thus brought into contact with the periphery of the wheel G. After said element comes into contact with the wheel, the bearing block 14 is pushed downwardly against the spring 15 until the member 17 contacts with the periphery of the wheel G throughout the width of said wheel. It will be apparent, therefore, that motion will be transmitted from wheel G to the friction cone or member 17 and thence, through the shaft sections 9, 11 and 4 to the cutter bar.

Importance is attached to the fact that the transmission gearing can be quickly shifted so as to drive the shaft section 11 at any speed desired and, furthermore, the friction element 17 can be quickly disengaged from the wheel G at any time so as to promptly stop the actuation of the cutter bar.

It will be apparent that this driving mechanism is to be actuated by the fly wheel of the motor F, it merely being necessary to provide said fly wheel with a tapered jacket for engaging the friction element 17. Furthermore, in order to apply this driving attachment to an ordinary motor vehicle, it is merely necessary first to attach the brackets 7 to the front axle, then fasten the bearings 12 and 13 to the chassis, and finally to cut openings in the floor of the body so as to receive the levers 23 and 29. Where the fly wheels rotate in planes parallel with the longitudinal center of the vehicle, the friction gearing can be varied to engage the side of the fly wheel rather than the periphery thereof.

Although the mechanism herein described is particularly designed for use in connection with a mowing attachment, it is to be understood that the said mechanism can be utilized for driving any other mechanism to be operated in connection with the motor vehicle.

What is claimed is:—

1. The combination with an automobile including a fly wheel driven by the motor, of a structure connected to the front portion of the automobile, driven mechanism mounted thereon, a shaft section, a tapered friction element revoluble therewith, yielding means for holding said element normally pressed against the fly wheel of the motor, connections between said shaft section and the driven mechanism, and separate means under the control of the operator for shifting the friction element into and out of engagement with the fly wheel and longitudinally in either direction while in engagement with said fly wheel.

2. The combination with an automobile including a fly wheel actuated by the motor, of a structure connected to the front axle of the automobile, mechanism carried by said structure, a shaft section, a tapered friction element mounted on said structure and feathered thereon, yielding means for pressing said element against the fly wheel, means under the control of the operator for shifting said element out of engagement with the fly wheel, means under the control of the operator for shifting said element longitudinally of the shaft section, and connections between said shaft section and the mechanism on the structure.

3. The combination with an automobile including a fly wheel adapted to be driven by the motor, of a structure connected to the front axle of the automobile and adapted to swing upwardly and downwardly relative thereto, mechanism upon said structure, a shaft section, a friction element mounted to slide thereon, said element being feathered upon the shaft, means for pressing said element yieldingly against the fly wheel, means under the control of the operator for shifting said element out of engagement with the fly wheel, means under the control of the operator for shifting said element in either direction along the shaft section, and means, including universal joints, for transmitting motion from said shaft section to the mechanism upon the structure.

4. The combination with an automobile including a fly wheel adapted to be driven by the motor, of a structure hingedly connected to the front axle of the automobile and adapted to swing relative thereto, mechanism mounted on the structure, a shaft section, including telescopically connected portions revoluble together, a friction element feathered on said section, means for holding said element yieldingly pressed against the fly wheel, means under the control of the operator for moving said element out of contact with the fly wheel, means under the control of the operator for shifting said element in either direction along the shaft section, and a connection between said shaft
5 section and the mechanism on the structure, said connection including a universal joint.

In testimony that I claim the foregoing as my own, I have hereto affixed my signature in the presence of two witnesses.

OTTO KLUGE.

Witnesses:
    Thos. H. Clark,
    Daisy V. McCoy.